United States Patent
Pawelski et al.

(10) Patent No.: US 11,814,486 B2
(45) Date of Patent: Nov. 14, 2023

(54) APPARATUS AND METHOD FOR MIXING RECYCLING MATERIAL INTO A POLYESTER MELT

(71) Applicants: UHDE INVENTA-FISCHER GMBH, Berlin (DE); thyssenkrupp AG, Essen (DE)

(72) Inventors: Alexander Pawelski, Felsberg (CH); Martin Hittorff, Bonaduz (CH); Heinrich Koch, Kleinmachnow (DE); Christopher Hess, Schönfließ (DE)

(73) Assignees: UHDE INVENTA-FISCHER GMBH, Berlin (DE); thyssenkrupp AG, Essen (DE)

( * ) Notice: Subject to any disclaimer, the term of this patent is extended or adjusted under 35 U.S.C. 154(b) by 616 days.

(21) Appl. No.: 16/969,813

(22) PCT Filed: Feb. 19, 2019

(86) PCT No.: PCT/EP2019/054079
§ 371 (c)(1),
(2) Date: Aug. 13, 2020

(87) PCT Pub. No.: WO2019/162265
PCT Pub. Date: Aug. 29, 2019

(65) Prior Publication Data
US 2020/0399437 A1  Dec. 24, 2020

(30) Foreign Application Priority Data
Feb. 20, 2018 (DE) .......... 10 2018 202 547.9

(51) Int. Cl.
| | | |
|---|---|---|
| B01F 35/80 | (2022.01) | |
| C08J 11/04 | (2006.01) | |
| B01J 19/00 | (2006.01) | |
| B01J 19/06 | (2006.01) | |
| B01J 19/24 | (2006.01) | |
| C08G 63/183 | (2006.01) | |
| B01F 35/92 | (2022.01) | |
| B01F 35/90 | (2022.01) | |
| B01F 101/00 | (2022.01) | |

(52) U.S. Cl.
CPC .............. *C08J 11/04* (2013.01); *B01F 35/80* (2022.01); *B01F 35/92* (2022.01); *B01J 19/0013* (2013.01); *B01J 19/06* (2013.01); *B01J 19/245* (2013.01); *C08G 63/183* (2013.01); *B01F 2035/99* (2022.01); *B01F 2101/2805* (2022.01); *B01J 2219/0004* (2013.01); *B01J 2219/00087* (2013.01); *C08J 2367/02* (2013.01)

(58) Field of Classification Search
USPC .......................................................... 521/48
See application file for complete search history.

(56) References Cited

U.S. PATENT DOCUMENTS

| | | | |
|---|---|---|---|
| 4,138,374 A | 2/1979 | Currie | |
| 5,597,852 A | 1/1997 | Unger | |
| 5,980,797 A | 11/1999 | Shelby | |
| 6,162,837 A | 12/2000 | Gerking | |
| 9,808,612 B2 | 11/2017 | Gulliver | |
| 2003/0134915 A1 | 7/2003 | Scantlebury | |
| 2007/0066792 A1 | 3/2007 | Colhoun et al. | |
| 2007/0232777 A1 | 10/2007 | Deardurff | |
| 2009/0203840 A1* | 8/2009 | Martin | B29C 48/37 525/50 |
| 2017/0312710 A1 | 11/2017 | Reuter | |

FOREIGN PATENT DOCUMENTS

| | | |
|---|---|---|
| CN | 101448566 A | 6/2009 |
| CN | 101805445 A | 8/2010 |
| DE | 2904020 A | 8/1979 |
| DE | 258240 A | 7/1988 |
| DE | 4314345 A | 11/1994 |
| DE | 69808055 T | 6/2003 |
| DE | 10 2006 023 354 A | 11/2007 |
| DE | 10 2012 002 047 A | 9/2012 |
| DE | 10 2016 108 108 A | 11/2017 |
| EP | 0 633 108 A | 1/1995 |
| EP | 0 942 035 A | 9/1999 |
| EP | 2 489 695 A | 8/2012 |
| EP | 1 461 379 B | 7/2013 |
| EP | 2 021 116 B | 9/2013 |
| JP | 10101784 A | 4/1998 |
| JP | 2002-249557 A | 9/2002 |
| JP | 63-46089 B | 6/2018 |
| KR | 1019980078130 A | 11/1998 |
| KR | 1020080049047 A | 6/2008 |
| KR | 1020160062078 A | 6/2016 |
| RU | 2236422 C | 9/2004 |
| WO | 2015/043985 A | 4/2015 |
| WO | 2015/043985 A1 | 4/2015 |
| WO | WO-2017220657 A1 * | 12/2017 ............. B29C 48/09 |

OTHER PUBLICATIONS

Dr. Hermann Ludewig, Polyesterfasem Chemie und Technologie, pp. 98-113, 146, 170-175, and 202-218 (1975). English translation enclosed.

(Continued)

*Primary Examiner* — Terressa Boykin
(74) *Attorney, Agent, or Firm* — thyssenkrupp North America, LLC

(57) ABSTRACT

Apparatuses and processes may be utilized for mixing used polyester into a polyester melt. In some processes an intermediate product stream is branched off from an intermediate stage in a virgin polyester production process. The intermediate product stream is then mixed with recycled polyester flakes in a dynamic mixer, where not more than 60% of a melting energy required to melt all the recycled polyester flakes is generated and/or supplied in the dynamic mixer. The mixture produced in this way is fed into a subsequent stage downstream of the intermediate stage and converted up to the desired degree of polycondensation. In this way, it is possible to physically reutilize used polyester or polyester waste.

18 Claims, 3 Drawing Sheets

(56) References Cited

OTHER PUBLICATIONS

English Translation of International Search Report issued in PCT/EP2019/054079, dated May 21, 2019.

Friedel Dickmeiss, High-efficiency dynamic cavity mixers for polymer processing, Chemical Fibers International Jan. 2, 2007, (Jul. 2007), pp. 45-48.

Polyesterfasern: Chemie and Technologie [Polyester Fibres: Chemistry and Technology], Hermann Ludewig, Akademie-Verlag, 2nd edition, 1974).

Din En ISO 1628-5 Plastics—Determination of the Viscosity of Polymers in Dilute Solution Using Capillary Viscometers—Part 5: Thermoplastic Polyester (TP) Homopolymers and Copolymers (ISO 1628-5:1998).

ASTM D-4603-03 Standard Test Method for Determining Inherent Viscosity of Poly(Ethylene Terephthalate) (PET) by Glass Capillary Viscometer, retrieved from https://wenku.baidu.com/view/ce4fd9edf8c75fbfc77db252.html, (2003).

Din En ISO 1628-5 Plastics—Determination of the Viscosity of Polymers in Dilute Solution Using capillary Viscometers—Part 5: Thermoplastic Polyester (TP) Homopolymers and COpolymers, ISO 1628-5:1198, (May 2015).

\* cited by examiner

APPARATUS AND METHOD FOR MIXING RECYCLING MATERIAL INTO A POLYESTER MELT

CROSS REFERENCE TO RELATED APPLICATIONS

This application is a U.S. National Stage Entry of International Patent Application Serial Number PCT/EP2019/054079, filed Feb. 19, 2019, which claims priority to German Patent Application No. DE 10 2018 202 547.9, filed Feb. 20, 2018, the entire contents of both of which are incorporated herein by reference.

FIELD

The present disclosure generally relates to apparatuses and processes for mixing used polyester into a polyester melt.

BACKGROUND

Plastics used to be exclusively burnt after their utilization phase. Only in the last few years has there been a move toward developing methods of physical reutilization of the plastics. However, these processes have to date been inadequate since they either provide products of inferior quality or have a high energy demand.

In the process for recovering linear polyester described in EP 0 942 035 A2, polyester wastes are comminuted and melted in an extruder. Then the diol corresponding to the base unit is added to the melt, such that glycolytic breakdown can take place. Subsequently, the melt treated in this way is postcondensed. Although this process regime counters the problem that the polyester wastes can often no longer be converted up to the desired degrees of polymerization after the melting owing to their elevated carboxylate concentrations, this process regime at the same time also requires a large amount of energy, and there is no means of undertaking thermal integration here.

The same applies to the process disclosed in EP 2 021 116 B1. New products are produced here from used polyester and virgin polyester. For this purpose, polyester waste, once it has been washed, is first melted in an extruder. In the same way as in EP 0 942 035 A2, a diol is added to the molten used polyester. Subsequently, the melt of the used polyester is mixed with a melt of virgin polyester. The result of combining virgin polyester and used polyester both in the form of melts and then additionally introducing energy into the system in the course of mixing is an unnecessary excess of heat. This has an adverse effect on the thermal balance of the process. The product quality also suffers owing to this unnecessary overheating.

JP 2002-249557 A likewise describes a process for producing a polyester using polyester waste. This involves melting polyester waste and adding it to a slurry composed of the terephthalic acid and ethylene glycol monomers. The melting of the polyester waste is implemented with the aid of a melt extruder which is costly to procure and to operate and makes the process uneconomic. Moreover, the process is disadvantageous since no steps for homogenization are envisaged after the addition of the used polyester melt of the slurry. It can therefore be assumed that the final product will not have a uniform microstructure and hence will not come close to fulfilling the product specifications defined for the corresponding virgin polyesters.

EP 1 461 379 B1 proposes a process for producing transparent polyester for the foods sector, in which polyester waste is used. In this case, transparent polyester wastes are fed continuously to an extruder and melted therein. The molten polyester wastes are then extruded in an early process stage of virgin polyester production.

A further pointer to a process for physical utilization of used polyester can be found in JP 10101784 A. Here too, energy is at first extended in order to melt small chips of a used polyester in an extruder. The melt of the used polyester chips is then fed into a reactor at a temperature of 220-260° C. and mixed with a slurry of the monomers for the virgin polyester production.

Thus a need exists for a process for physical reutilization of used polyester which has been energetically optimized and by which high-quality products can be produced. In addition, an apparatus for performance of the process that entails low capital and operating costs is needed.

DETAILED DESCRIPTION

Figure 1:
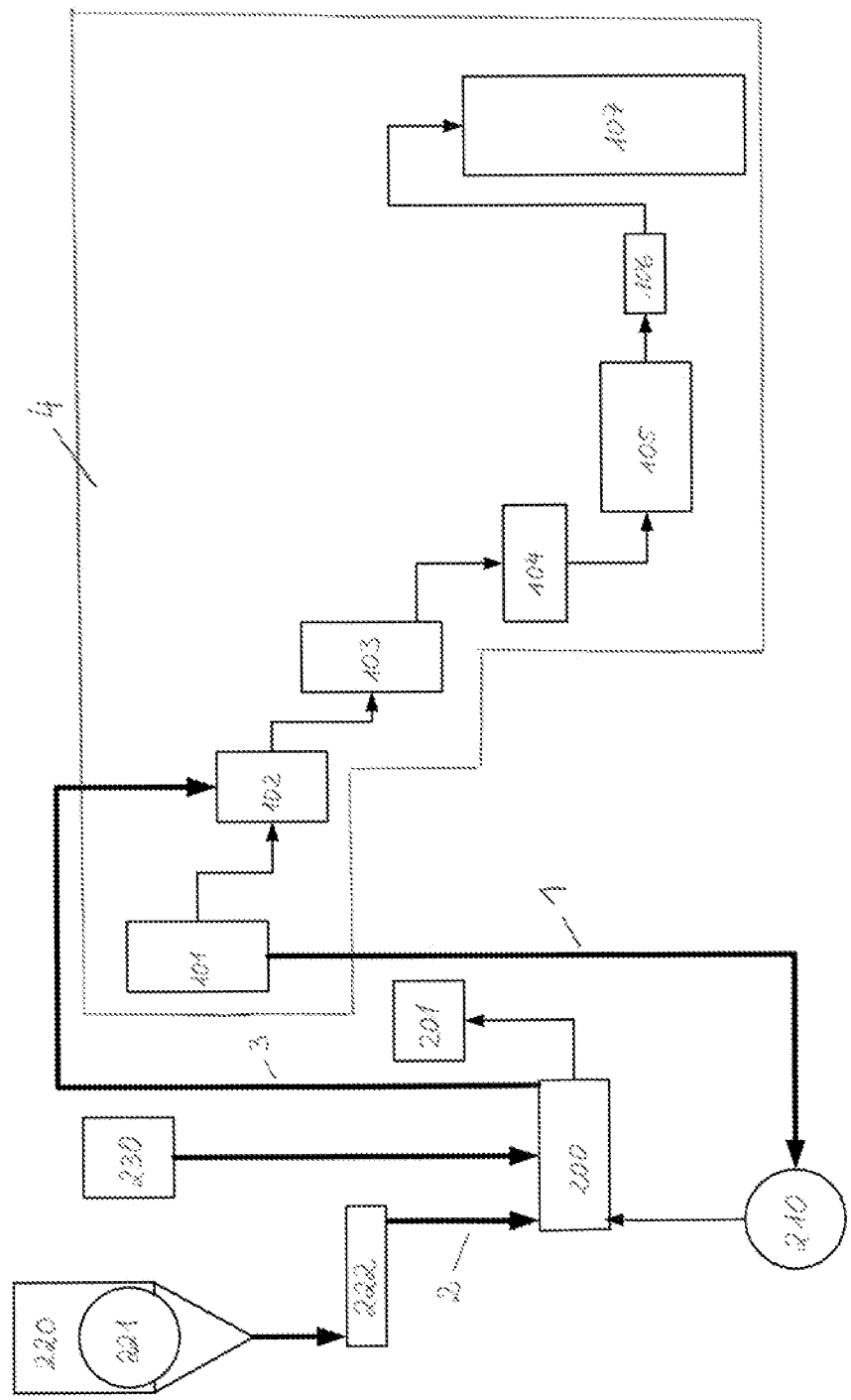
FIG. 1 is a flow diagram for a first example process.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates apparatuses and processes for mixing used polyester into a polyester melt. An intermediate product stream may be branched off from an intermediate stage in a virgin polyester production process, mixed with recycled polyester flakes in a dynamic mixer, where not more than 60% of the melting energy required to melt all the recycled polyester flakes is generated and/or supplied in the dynamic mixer. The mixture produced in this way can be fed into a subsequent stage downstream of the intermediate stage, and converted up to the desired degree of polycondensation later on in the process. In this way, it is possible to physically reutilize used polyester or polyester waste.

In the context of the present invention, the terms which follow are to be understood as follows:

Virgin Polyester:

Virgin polyester is preferably produced by polycondensation of monomeric reactants, especially by continuous or batchwise melt polycondensation, optionally followed by solid-phase postcondensation, from monomeric reactants (see, for example, Polyesterfasern: Chemie and Technologie [Polyester Fibres: Chemistry and Technology], Hermann Ludewig, Akademie-Verlag, 2nd edition, 1974).

The term "virgin polyester" refers to a polyester prior to its phase of utilization as intended, i.e. the end product in the production of virgin polyester.

The end product can be provided in chips, as pellets or in other standard forms; chips and pellets (cylindrical or spherical particles having average masses of 10-50 mg) are of particularly good suitability for the processing of virgin polyester to give fibres, filaments, packaging films, other films or packaging containers (e.g. drinks bottles or thermoforming films).

From a physical point of view, virgin polyesters may be understood to mean all known types of polyester, but especially polyethylene terephthalate (PET) and polybutylene terephthalate (PBT), polytrimethylene terephthalate (PTT), polyethylene naphthalate (PEN), polyethylene dicarboxyfuranoate (PEF), polytrimethylene furanoate (PTF), polyethylene furanoate (PBF) and polyethylene terephthalate glycol (PET-G). These types of polyester are produced from mixtures comprising aromatic or heteroaromatic dicarboxylic acids, e.g. terephthalic acid (PTA), naphthalene-2,6-dicarboxylic acid (NDCA) or 2,5-furandicarboxylic acid (FDCA); and/or corresponding diesters, especially corresponding dimethyl esters; and diols, for example ethylene glycol (EG), propane-1,3-diol (1,3-PDO), butanediol (BDO) and cyclohexane-1,4-dimethanol (CHDM).

In addition, it is possible to use comonomers, for example isophthalic acid (IPA), diethylene glycol (DEG) or aliphatic dicarboxylic acids, for example succinic acid, adipic acid etc., in the production of the virgin polyesters. These serve in particular to modify the properties of the virgin polyester in a controlled manner. It is also possible for comonomers that can arise from the monomers during the production (e.g. DEG) and additives such as catalysts, stabilizers, dyes and flatting agents to be provided in a process for producing virgin polyester. A typical addition is, for example, 0.01-1% by mass of titanium dioxide. Alternatively or additionally, however, it is also possible to use small amounts of other additives, for example barium sulfate or calcium carbonate, in the virgin polyester production.

Specifically, virgin polyester is understood to mean a polyester having a viscosity number measured according to DIN EN ISO 1628-5 of >80, preferably of >100 and more preferably of >120, or an intrinsic viscosity measured according to ASTM D-4603-03 of >0.5 dL/g, preferably of >0.6 dL/g and more preferably of >0.7 dL/g.

Intermediate Product:

The intermediate product is distinct from the virgin polyester in that it has a lower degree of polycondensation or a lower viscosity number or intrinsic viscosity than the virgin polyester. The reason for this is that the intermediate product has not passed through all the steps in the virgin polyester production process, but has been branched off therefrom. The branching is effected here in each case upstream of the filtration step and upstream of the postcondensation of the prepolymer in the final reactor. The intermediate product is also characterized in that it is at a temperature above its melting point.

For process-related reasons alone, the intermediate product still contains residues of free diol, preferably ethylene glycol. Alternatively, the proportion of diol can be increased deliberately beyond the residual concentration by metering diol into the intermediate product after branching it. The effect of a high proportion of diol in the intermediate product is such that the recycled polyester flakes dissolve more quickly in the intermediate product since the convection of heat is improved.

One example of the intermediate product is the esterification product obtained in the first stage of the virgin polyester production process, in the esterification reactor. It has a degree of polycondensation of 1 to 6.

A further example of the intermediate product is the postesterification product obtained in the second stage of the virgin polyester production process, the postesterification reactor. It has a degree of polycondensation of 4 to 12.

A third example of the intermediate product is the prepolymer obtained in the third stage of the virgin polyester production process, the pre-polymerization reactor. It has a degree of polycondensation of 20 to 50.

Recycled Polyester:

Immediately after the production of virgin polyester, the virgin polyester is processed by means of one or more steps to give fibres, filaments, foils, mouldings or packaging containers (especially to give drinks bottles). For this purpose, the virgin polyester pellets or chips are usually converted to the melt phase again and small amounts of processing auxiliaries may be added to the virgin polyester.

Recycled polyester refers here firstly to the waste in the further processing of the virgin polyester. But by far the greatest portion of recycled polyester is made up by the polyester waste obtained after the utilization phase of the processed polyester, for example after utilization as textile, drinks bottle and packaging film.

Preferably, the recycled polyester is cleaned polyester waste that has been freed of any fractions of foreign matter and adhering soil. Various methods are suitable for the cleaning: firstly, the polyester waste can be washed. A useful washing liquid is water or water with wash-active substances. It is likewise possible to wash with various solvents for detachment/dissolving of impurities. In addition, physical separation methods may be used for removal of foreign matter. In order to separate foreign matter having a higher or lower specific density than the used polyester, separation processes such as flotation, wind-sifting or centrifugation are conducted. It is also conceivable to remove impurities in the recycled polyester by utilization of specific properties. Magnetic substances can be removed by means of a magnet and coloured impurities by mechanical means using what are called sorters.

Recycled polyester is preferably provided in the form of recycled polyester flakes. These are comminuted particles of polyester waste that are typically obtained by shredding or grinding recycled polyester. The recycled polyester flakes preferably have a round or elongated shape, the thickness of which in one dimension is less than 1 mm, preferably less than 0.5 mm, and the length of which in another dimension is less than 50 mm, preferably less than 30 mm. The average particle size $d_{90}$ of the recycled polyester flakes is advantageously from 4 to 10 mm, and so they can be distributed rapidly in a melt or liquid phase.

A typical example of recycled polyester flakes is what are called "post-consumer recycling" flakes (PCR flakes), for example from recollected PET drinks bottles. A typical specification for such flakes—without wishing to restrict the meaning of recycled polyester flakes in the context of the invention—is as follows:

maximum flake diameter: 20 mm
proportion of flakes with diameters of 4 to 10 mm: >95% by wt.
proportion of flakes with maximum diameter 0.5 mm: <0.5% by wt.
proportion of blue flakes: <5.0% by wt.
proportion of coloured flakes: <0.05% by wt.
colour values (after crystallization 2 h@150° C.) L*>70 b*<3
water content: <0.7 wt. %
PVC content: <10 ppm
metal content (e.g. Al, Fe, Zn): <5 ppm HDPE/LDPE/PP content: <25 ppm
adhesive content: <20 ppm
further insoluble matter (e.g. paper, metal, silicones): <100 ppm Dynamic Mixer:

The dynamic mixer is an apparatus by which multiple starting materials having different properties are combined to give a mixture of matter, said mixture of matter having high homogeneity.

In the present invention, the dynamic mixer is used for homogeneous mixing of the recycled polyester flakes into an intermediate product. The mixing tools in the dynamic mixer accelerate the mixing material ideally in such a way that there is constant change in intensity and direction of the input of force. If this is not the case, it is a stirrer. By contrast with a dynamic mixer, a stirrer serves merely to set a substance in motion and to keep it in motion and to prevent sedimentation.

By means of the dynamic mixer, two different phases are processed to give a homogeneous mixture (e.g. suspension). The dynamic mixer brings the phases to be mixed into good contact with one another and has the effect of constant formation of a large, constantly renewing surface between the phases.

The dynamic mixer is preferably operated continuously, but quasi-continuous or batchwise operation is also possible.

A dynamic mixer is understood to mean an in-line mixer. Classic tubular mixers and drum mixers are excluded from the definition of a dynamic mixer.

In addition, static mixers constructed without moving parts are excluded from the definition of a dynamic mixer. In a static mixer, the energy for improving the mixing has to be supplied externally (for example via a pump). The pressure drop in a static mixer is converted to friction energy which is utilized to improve the mixing quality.

Lastly, the definition of a dynamic mixer shall also exclude an extruder, the main task of which is the melting of a substance or substance mixture in such a way that energy is transferred in the form of internal friction within the substance and friction between the substance and the extruder elements or the extruder housing.

The dynamic mixer preferably has a horizontal design.

A multishaft mixer may be present in the mixing chamber of the dynamic mixer. But preference is given to a single-shaft mixer with or without baffles.

The dynamic mixer may be configured as a blade mixer, paddle mixer, shovel mixer, spiked mixer, impeller mixer, propeller mixer, turbine mixer, anchor mixer, centrifuge, toothed disc mixer or turbo mixer. Preference is given to the embodiment as a turbo mixer.

The mixing system of the dynamic mixer can be rotated at a high speed and enables the formation of turbulent flows. The mixing system is driven by a motor, preferably up to a speed of >300 revolutions per minute, more preferably >500 revolutions per minute, especially >1000 revolutions per minute.

The dynamic mixer may comprise an electrical heater and/or a heat exchanger, for example in the form of a liquid- or steam-heated outer shell.

Furthermore, it is preferable when the dynamic mixer has an inlet orifice for the melt of the intermediate product from the virgin polyester production and an inlet orifice for the recycled polyester flakes, each with feed units connected upstream thereof. The inlet orifice for the recycled polyester flakes is more preferably provided with redundancy (twice) in order to be able to further operate the process in the event of blockage. In one embodiment, the dynamic mixer may additionally also comprise an inlet orifice for the addition of diol.

Furthermore, the dynamic mixer may comprise an opening or a stub for the application of reduced pressure. Moreover, the dynamic mixer comprises an opening for the exit of the mixture of recycled polyester flakes and intermediate product.

The shaft of the motor with which the mixing system is driven preferably has a sealed bushing or a magnetic coupling.

Exchange of the mixing system is preferably enabled in that the dynamic mixer consists of at least two parts that can be parted from one another.

Preferably, the dynamic mixer is operated at a temperature of up to 10 K, preferably of up to 20 K and more preferably of up to 30 K above the melting point of the fresh polyester.

The dynamic mixer is preferably operated at a maximum pressure of up to 5 bara, more preferably at atmospheric pressure, most preferably under reduced pressure (500-10 mbara).

The process according to the invention for production of a polyester using recycled polyester flakes comprises the following steps:

i. branching off an intermediate product stream from an intermediate stage in a virgin polyester production process;
ii. mixing the intermediate product stream with recycled polyester flakes in a dynamic mixer;
iii. feeding the mixture into a downstream stage downstream of the intermediate stage or recycling the mixture into that reaction stage from which the intermediate product stream has been taken in step i);
iv. converting the mixture up to a desired level of polycondensation;

wherein, in step ii), not more than 60% of the melting energy required to melt all the recycled polyester flakes is generated and/or supplied.

It is preferable when a maximum of 50% of the melting energy required to melt all the recycled polyester flakes is generated and/or supplied in the mixing of the intermediate product stream with the recycled polyester flakes.

More preferably, not more than 30% of the melting energy required to melt all the recycled polyester flakes is generated and/or supplied in the mixing of the intermediate product stream with the recycled polyester flakes.

The melting energy of the flakes corresponds here to the enthalpy $\Delta H$, which can be calculated with the aid of the following formula (I):

$$\Delta H = \int_{T_0}^{T_m} C_p(T)dT + \Delta H_m \qquad (I)$$

$C_p$ here represents the heat capacity of all the flakes in J/K, $T_0$ the temperature of the flakes on entry into the dynamic mixer, $T_m$ the melting temperature of the flakes and $\Delta H_m$ the enthalpy of fusion of all flakes in J.

By virtue of the process regime of the invention, the input of the energy required for melting of the flakes is not restricted solely to the process step of mixing. The energy input can take place in a distributed manner over multiple process steps.

Overheating of intermediate product and/or recycled polyester flakes in the mixer can be prevented in this way.

Preferably, the increase in temperature between the theoretical mixing temperature at the mixer inlet and the theoretical mixing temperature at the outlet is not more than 10 K.

Preferably, the recycled polyester flakes on entry into the dynamic mixer have an average temperature of 0 to 200° C., preferably of 30 to 180° C., more preferably of 100 to 150° C.

In the process according to the invention, the intermediate product stream can be supplied with at least 40% of the melting energy prior to step ii). In this case, however, the residence time in the dynamic mixer is sufficiently short that the intermediate product stream in the dynamic mixer can transfer less than 40% of the melting energy to the recycled polyester flakes.

Preferably, the mixture is supplied with at least 40% of the melting energy after step ii).

The dwell time of the intermediate product stream and the recycled polyester flakes in the dynamic mixer is preferably not more than 60 seconds, more preferably not more than 40 seconds, even more preferably not more than 30 seconds, especially not more than 20 seconds.

In one variant of the process, step ii) is conducted at an absolute pressure of 3 to 100 mbar, preferably of 20 to 50 mbar.

In a further embodiment, the mixture, prior to attainment of the desired degree of polycondensation, preferably at a time at which the mixture has an intrinsic viscosity measured to ASTM D-4603-03 of 0.25 to 0.4 dL/g, is filtered, preferably removing suspended matter having a size of 5 to 100 μm, especially suspended matter having a size of 10 to 60 μm.

The desired degree of polycondensation in the process according to the invention may be 100 to 200, preferably 120 to 150. The mixture converted up to the desired degree of polycondensation has an intrinsic viscosity measured to ASTM D-4603-03 of 0.6 to 0.9 dL/g.

Preferably, in step i), 10% to 100% of the overall stream is branched off as intermediate product stream at the intermediate stage.

Advantageously, the intermediate product stream contains a diol, preferably ethylene glycol, more preferably in a proportion of 0% to 0.8% by weight, especially in a proportion of 0-0.4% by weight.

The mixture may contain 5% to 60% by weight, preferably 10% to 40% by weight, of recycled polyester flakes. This means that the recycled polyester flakes can be dosed in a mass ratio of 5:95 to 60:40, preferably of 10:90 to 40:60, into the dynamic mixer based on the intermediate product stream.

In a further embodiment of the process, the intermediate product stream and the recycled polyester flakes in the dynamic mixer are additionally mixed with an additive selected from the group consisting of catalysts, stabilizers, dyes, flatting agents, optical brighteners and mixtures thereof, using the additive in a proportion of not more than 5% by weight based on the resulting mixture.

The apparatus of the invention for producing a polyester using recycled polyester flakes comprises
an apparatus for producing virgin polyester having multiple successive reaction vessels and
a dynamic mixer,
wherein the dynamic mixer has at least two inlets, of which a first inlet is connected to a first reaction vessel and a second inlet is connected to an apparatus for dosage of bulk material, and wherein an outlet of the dynamic mixer is connected to a second downstream reaction vessel.

In a first embodiment, the apparatus further comprises an apparatus for comminution of recycled polyester which is connected upstream of the apparatus for dosage of bulk material.

Preferably, the apparatus further comprises at least one heat exchanger, where a first heat exchanger is preferably disposed between the apparatus for comminution of recycled polyester and the apparatus for dosage of bulk material and a second heat exchanger is preferably disposed between the first reaction vessel and the dynamic mixer.

Preferably, at least one apparatus for creation of a reduced pressure is connected to the dynamic mixer.

According to the invention, the apparatus described above is used for physical utilization of polyester wastes.

The experimental examples which follow are intended as technical background for the present invention and to facilitate understanding of the invention.

Analysis/Methods

The melting of recycled PET flakes in the melt is assessed visually. Complete dissolution in the context of the invention means that not more than 1 recycled PET flake in every 100 added can be detected by the naked eye in the melt of the intermediate product. At the same time, it is assumed that the recycled PET flakes have dissolved completely in the melt when, in a hot filtration of the resultant mixture through a suitable sieve having a maximum mesh size of 250 μm, not more than 1 recycled PET flake in every 100 is retained. Excluded from this are foreign particles in the recycled polyester (metal turnings, soil, sand, paper, polymers with a different chemical composition etc.) that cannot be dissolved under the conditions chosen, if at all, or are not transferred into a liquid phase.

The intrinsic viscosity (i.v.) of polyethylene terephthalate is determined to ASTM 4603-03. For this purpose, the polyester is dissolved in the phenol/tetrachloroethane solvent mixture (mass ratio 6:4) in a concentration C of 0.5 g/dL and then the flow time is determined in a DIN type 1a capillary viscometer (capillary diameter 0.95 mm) at 30.0° C. The relative solution viscosity $\eta_{rel}$ is ascertained from the flow time of the solution t [s] and the flow time of the pure solvent $t_0$ [s]:

$$\eta_{rel} = t/t_0$$

The intrinsic viscosity i.v. [dL/g] is calculated from the relative solution viscosity $\eta_{rel}$ and the concentration C [g/dL] as:

$$i.v. = 0.25(\eta_{rel} - 1 + 3 \cdot ln\eta_{rel})/C$$

Preparation

As preparation for the experiments, an esterification product was produced. Recycled polyester flakes were also pretreated.

1) With the aid of the continuously operated apparatus according to EP 1 448 658, an esterification product was produced from terephthalic acid and ethylene glycol (molar ratio=1:1.75) at an esterification temperature of 260° C. and a pressure of 2.6 bar and an average dwell time of 90 minutes with addition of the antimony glycolate catalyst for an amount of 250 ppm of antimony in the final PET. Via a sampling valve, the esterification product ("$VP_0$" hereinafter) was withdrawn in liquid form and, after cooling in a sheet-metal tray, coarsely comminuted. The degree of conversion (proportion of terephthalic acid units reacted) of $VP_0$ was 94.5% and the content of free acid end groups was 820 mmol/kg.

2) Post-consumer recycling PET flakes (recycled PET flakes; from Wellmann, the Netherlands; colour: L*=54.3; a*=−3.1; b*=−2.6; bulk density about 270 kg/m$^3$) were predried in an air circulation drying cabinet over a period of 2 hours and heated to a temperature of 170° C. No caking or agglomerating of the flakes was detected in this treatment.

Experiment 1 with Recycling of Recycled PET Flakes

A 500 ml three-neck flask provided with a close-clearance paddle stirrer, a stub for a gas inlet and a gas outlet, and a thermometer was initially charged with 241.5 g of VP$_0$ and melted under a nitrogen blanket by means of an electrically operated heating mantle. After the melting, the stirrer was switched on (300 revolutions per minute) and heating of the melt continued up to 290° C.

With the aid of a funnel, over a period of 30 seconds, 24.4 g of the heated recycled PET flakes were added to the melt in the three-neck flask. In the course of this, the temperature of the melt fell to about 285° C. After 60 seconds, >95% of the flakes were melted and homogeneously distributed in the liquid melt phase. After a further 60 seconds, >99% of the flakes were melted and homogeneously distributed in the melt. 180 seconds after the addition of the flakes had ended, the melt was poured out of the three-neck flask into an aluminium dish and cooled therein (VP$_0$ with PET flakes; product M1).

A glass polycondensation apparatus (about 300 ml, provided with a laterally mounted gas inlet stub and with a helical stirrer) was charged with 60 g of the cooled and coarsely comminuted product M1 and heated with the aid of an electrically operated heating mantle. After the product M1 had been melted, the stirrer was switched on (150 revolutions per minute) and the melt was heated up to 280° C. and kept at that temperature. Subsequently, the pressure in the apparatus was lowered to 600 mbar by applying reduced pressure and kept at that level. 45 minutes after commencement of the application of the reduced pressure, the apparatus was briefly vented with nitrogen and a sample (sample "PE") was taken.

Subsequently, 10 µl of the triethyl phosphate stabilizer were added and the pressure in the apparatus was lowered to 30 mbar by applying reduced pressure and kept at that level. After a further 45 minutes, the apparatus was briefly vented with nitrogen and a further sample (sample "PP") was taken.

Subsequently, the pressure in the apparatus was lowered to 1.0 mbar by applying reduced pressure and was maintained for 5 hours during this polycondensation phase. Every 60 minutes, the apparatus was vented briefly with nitrogen and a sample was taken each time (samples "PET1", "PET2", "PET3", "PET4" and "PET5", taken after 1 to 5 hours).

Experiment 2 without Recycling

|      | Experiment 1 i.v. [dL/g] | Experiment 2 i.v. [dL/g] |
| --- | --- | --- |
| PE   | 0.12 | 0.11 |
| PP   | 0.22 | 0.17 |
| PET1 | 0.57 | 0.39 |
| PET2 | 0.70 | 0.59 |
| PET3 | 0.58 | 0.70 |
| PET4 | 0.51 | 0.71 |
| PET5 | 0.46 | 0.62 |

As a comparative example, an experiment identical to experiment 1 was conducted with 60 g of the esterification product VP$_0$ obtained directly from the pilot plant.

Experimental Results

For all samples, intrinsic solution viscosity i.v. was determined to ASTM D-4603-03.

Table 1: Experimental results of experiment 1 and comparative experiment 2

It is found that, after addition and mixing of the flakes into the melt of the esterification product VP$_0$, in the subsequent process stages, a higher intrinsic viscosity is already measured after shorter times than in the case of the identically treated esterification product VP$_0$ without addition of PCR flakes. This means that addition of the flakes during the production of PET allows an end product of a given viscosity to be attained more quickly than without addition of the flakes. PET production plants can thus be operated more economically (shorter dwell time) on addition of PCR flakes and with higher throughput. The end products obtained, with regard to the properties of solution viscosity (and the content of COOH end groups) that are crucial to the further processing, are identical to a PET produced without added flakes. The colour of the PET end product after addition of flakes to the esterification product, by contrast, is affected by the nature and amount of the flakes added. But this can be very substantially compensated for by appropriate colour correction measures.

Experiment 3, Increasing the Proportion of Recycled Flakes:

A 500 ml three-neck flask provided with a close-clearance paddle stirrer, a stub for a gas inlet and a gas outlet, and a thermometer was initially charged with 266.6 g of VP$_0$ and melted under a nitrogen blanket by means of an electrically operated heating mantle. After the melting, the stirrer was switched on (300 revolutions per minute) and heating of the melt continued up to 290° C.

With the aid of a funnel, over a period of 60 seconds, 144.1 g of the heated recycled PET flakes were added to the melt in the three-neck flask. In the course of this, the temperature on the melt fell to about 283° C. 60 seconds after the end of the addition, >90% of the flakes were melted and distributed homogeneously in the liquid melt phase. After a further 60 seconds, >99% of the flakes were melted and distributed homogeneously in the melt. 180 seconds after the addition of the flakes had ended, the melt was poured out of the flask into an aluminium dish and cooled therein (product M3).

It is found that even high proportions (here 144.1 g of flakes in 266.6 g of esterification product, corresponding to a proportion of 1:1.85 or 35.1% in the monomer melt) can be melted and dissolved rapidly and completely in the VP$_0$ melt.

Experiment 4, Recycling with Colour Correction:

A 500 ml three-neck flask provided with a close-clearance paddle stirrer, a stub for a gas inlet and a gas outlet, and a thermometer was initially charged with 241.2 g of VP$_0$ and melted under a nitrogen blanket by means of an electrically operated heating mantle. After the melting, the stirrer was switched on (300 revolutions per minute) and heating of the melt continued up to 290° C. Subsequently, 2.0 g of ethylene glycol were added together with 0.5 mg of Estofil Blue S-RBL dye in suspension (Solvent Blue 104; manufacturer: Clariant, Switzerland).

With the aid of a funnel, over a period of 30 seconds, 24.5 g of the heated recycled PET flakes were added to the melt in the three-neck flask. After 60 seconds, >90% of the flakes were melted and distributed homogeneously in the liquid phase; within a further 60 seconds, >99% of the flakes were melted and distributed homogeneously in the melt. 180 seconds after the addition of the flakes had ended, the melt was poured out of the flask into an aluminium dish and cooled therein (product M4).

The product M1 and the product M4 were each supplied to a ZM 200 centrifugal mill (manufacturer: Retsch, Germany) with a 12-tooth inserted rotor and an installed annular sieve with trapezoidal hole D=0.75 mm, and comminuted to a powder. Subsequently, the colour of the powder was ascertained in a quartz glass cuvette for the CIE L*a*b* colour system with a CM-3500d colorimeter (manufacturer: Konica-Minolta, Japan) with D65 standard illuminant.

TABLE 2

Comparison of the colour values before and after colour correction

| Product | L* colour (brightness) | b* colour (yellow/blue colour) |
|---|---|---|
| M1 | 95.1 | +2.5 |
| M4 | 93.8 | −1.8 |

It is found that the colour of a product that arises in the production of polyester using recycled polyester flakes can be influenced by the addition of a dye distributed in a diol and hence corrected. The addition of a blue dye can compensate for a yellow tinge (positive b* value) and achieve a neutral colour. Colour correction is effective not only directly after the addition of colour but also affects the end product from the recycled polyester production processes in a corresponding manner.

FIG. 1 shows a flow diagram for a first embodiment of the process according to the invention, in which the intermediate product stream is branched off from the esterification reactor and accordingly consists of the esterification product with a degree of polycondensation of 1 to 6.

In the first embodiment in FIG. 1, at least a portion of an esterification product stream is branched off from an esterification reactor 101 as intermediate product stream 1. This intermediate product stream 1 is passed through a heat exchanger 210 and then fed to a dynamic mixer 200. As well as the intermediate product stream 1, the mixer has a second input stream, the recycled polyester stream 2. The recycled polyester stream 2 is fed from a reservoir vessel or a silo 220. The recycled polyester may be contacted here with a preheater 221, the preheater either being a separate unit or part of the silo 220. The dosage and hence the adjustment of the ratio of recycled polyester to intermediate product is effected with the aid of the metering apparatus 222. Also optionally envisaged is a further input stream 230 into the dynamic mixer 200, disposed at any position in the outer mixer shell. Additives and/or monomeric diol may be introduced into the dynamic mixer via this input stream 230. A vacuum apparatus 201 assures a desired reduction in pressure in the dynamic mixer 200.

After a short dwell time of the input streams in the dynamic mixer, a mixture 3 is formed, in which the recycled particles are distributed homogeneously in the intermediate product, but have not yet completely dissolved (homogeneous distribution of concentration, but no uniform, constant temperature).

The mixture is then introduced into a further reaction unit of the virgin polyester plant 4, namely into the postesterification reactor 102. The postesterification in the postesterification reactor 102 is the stage subsequent to the esterification in the esterification reactor 101 in the virgin polyester plant.

Figure 2:
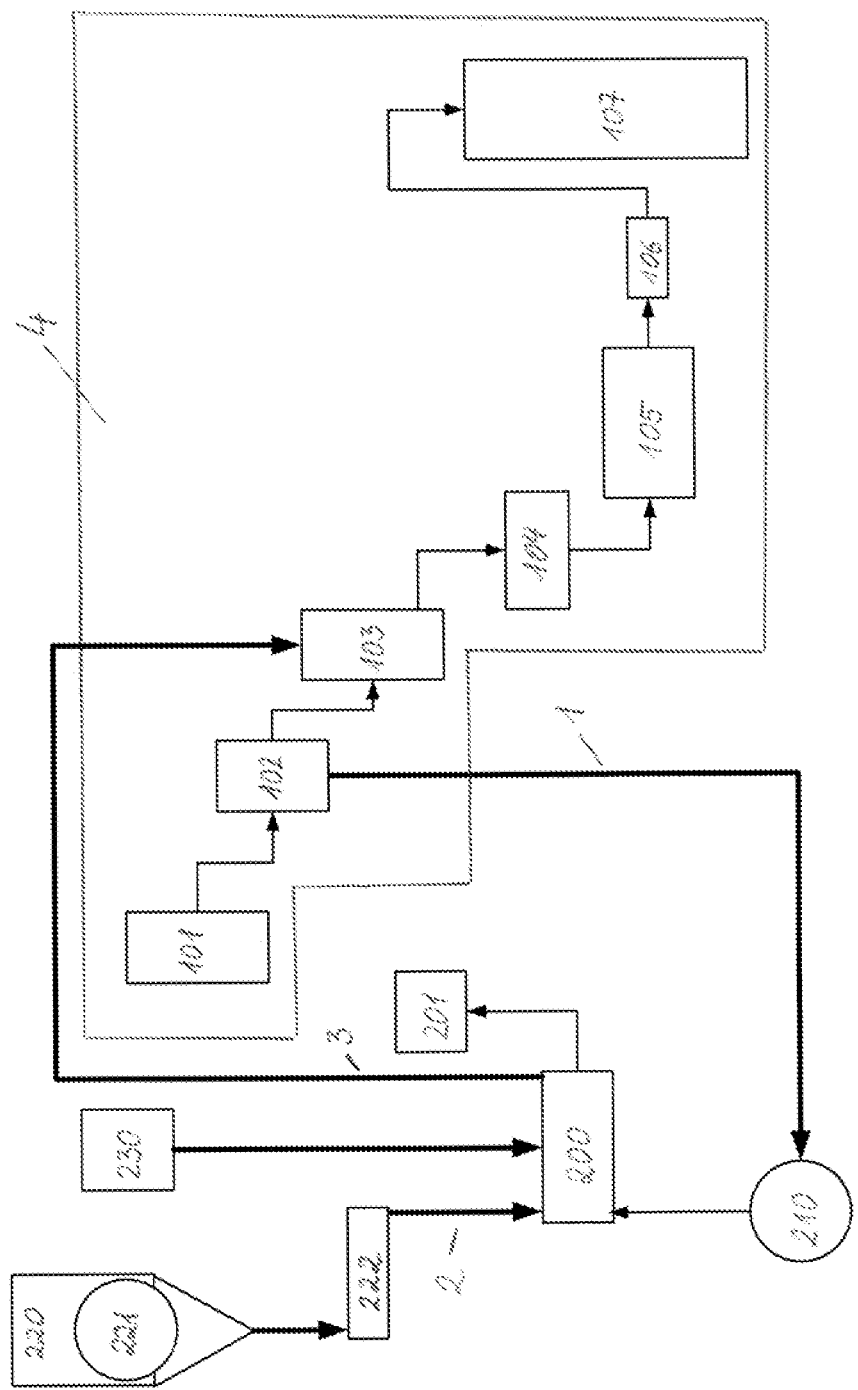
FIG. 2 is a flow diagram for a second example process.
Figure 3:
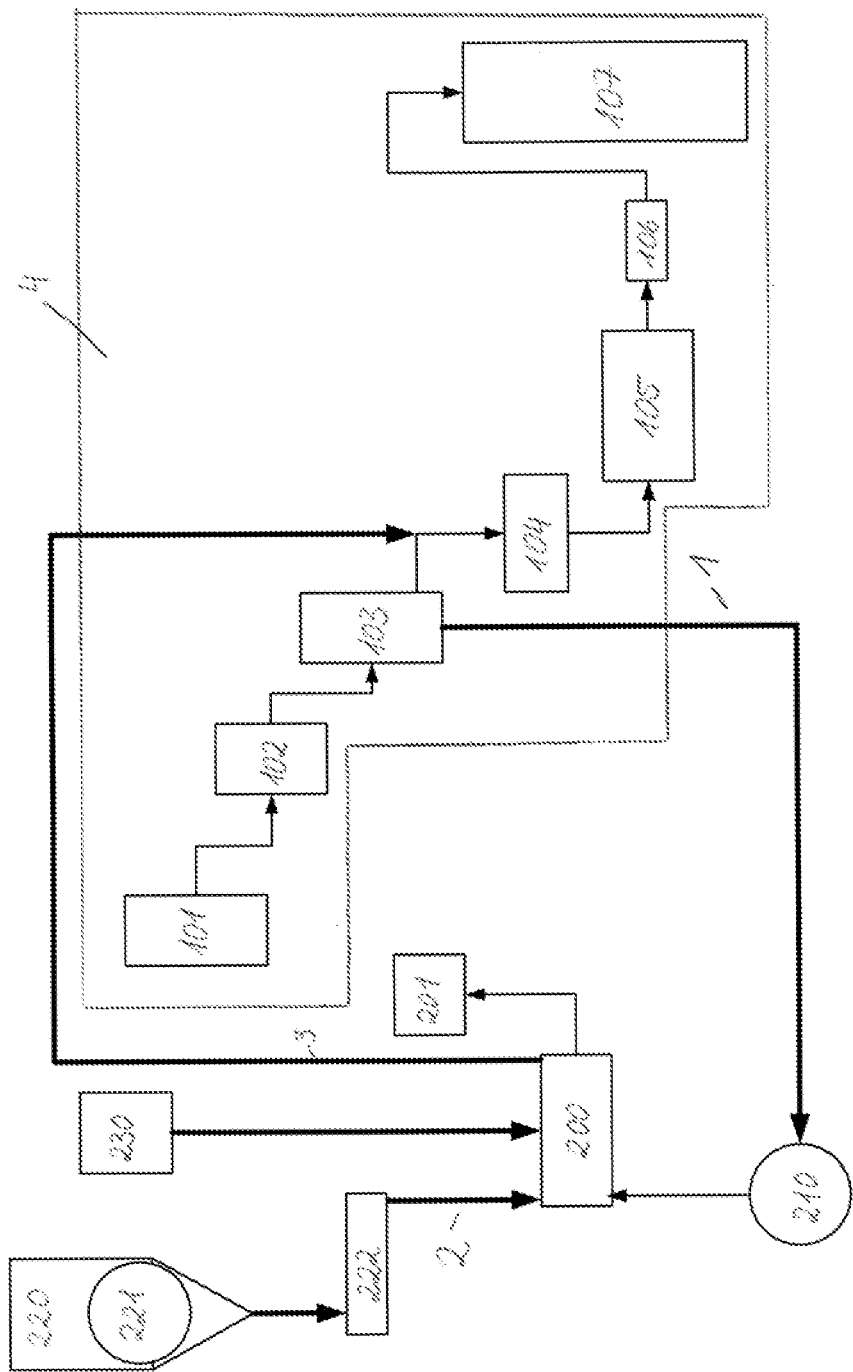
FIG. 3 is a flow diagram for still another example process.

Unlike what is shown in the working examples, the mixture 3 may also be recycled into the same reactor stage from which the intermediate product stream 1 has been withdrawn beforehand, i.e. into the reactor stage 101 in the example according to FIG. 1, into the reactor stage 102 in the example according to FIG. 2, and into the reactor stage 103 in the example according to FIG. 3. Recycling into reactor stage 101 is preferred due to the excellent conditions in regard to mixing of the reactor content, residence time in this reactor stage and the large heat exchanging area available in this reactor stage.

The further conversion of the mixture up to higher molecular weights is effected in a pre-polycondensation reactor 103 which is the last process stage of the filtration apparatus 104. Condensation up to the desired degree of polymerization takes place in the final reactor 104 after passage through the filter apparatus 104. The melt can then be processed to small pellets in a pelletizer 105 and stored in a silo 107.

FIG. 2 shows a flow diagram for a second embodiment of the process according to the invention, in which the intermediate product stream from the postesterification reactor is branched off and accordingly consists of the postesterification product with a degree of polycondensation of 4 to 12.

FIG. 3 shows a flow diagram for a further embodiment of the process according to the invention, in which the intermediate product stream from the pre-polycondensation reactor is branched off and accordingly consists of the prepolymer with a degree of polycondensation of 20 to 50.

What is claimed is:

1. A process for producing polyester using recycled polyester flakes, the process comprising:
    branching off an intermediate product stream from an intermediate stage in a virgin polyester production process;
    mixing the intermediate product stream with recycled polyester flakes in a dynamic mixer to form a mixture, wherein not more than 60% of a melting energy required to melt the recycled polyester flakes is generated and/or supplied;
    feeding the mixture into a downstream stage downstream of the intermediate stage and/or recycling the mixture into a reaction stage from which the intermediate product stream was taken; and
    converting the mixture up to a desired level of polycondensation.

2. The process of claim 1 wherein upon entry into the dynamic mixer the recycled polyester flakes have an average temperature of 0 to 200° C.

3. The process of claim 1 comprising supplying the intermediate product stream with at least 40% of the melting energy prior to the mixing, wherein the intermediate product stream transfers less than 40% of the melting energy to the recycled polyester flakes during a dwell time in the dynamic mixer.

4. The process of claim 1 comprising supplying the mixture with at least 40% of the melting energy after the mixing.

5. The process of claim 1 wherein a dwell time of the intermediate product stream and the recycled polyester flakes in the dynamic mixer is not more than 60 seconds.

6. The process of claim 1 wherein the mixing is performed at an absolute pressure of 3 to 100 mbar.

7. The process of claim 1 comprising filtering the mixture prior to attainment of the desired level of polycondensation.

8. The process of claim 1 wherein at least one of:
the desired level of polycondensation is 100 to 200, or
the mixture converted up to the desired level of polycondensation has an intrinsic viscosity measured according to ASTM D-4603-03 of 0.6 to 0.9 dL/g.

9. The process of claim 1 wherein 10% to 100% of an overall stream is branched off as the intermediate product stream at the intermediate stage.

10. The process of claim 1 wherein the intermediate product stream contains a diol.

11. The process of claim 1 wherein the mixture contains 5% to 60% by weight recycled polyester flakes.

12. The process of claim 1 comprising mixing the intermediate product stream and the recycled polyester flakes in the dynamic mixer with an additive selected from a group consisting of catalysts, stabilizers, dyes, flatting agents, optical brighteners, or mixtures thereof, wherein the additive is used in a proportion of not more than 5% by weight based on a resulting mixture.

13. An apparatus for producing polyester using recycled polyester flakes, the apparatus comprising:
an apparatus for producing virgin polyester having multiple successive reaction vessels; and
a dynamic mixer with a first inlet, a second inlet, and an outlet, wherein the first inlet is connected to a first reaction vessel of the multiple successive reaction vessels, wherein the first inlet is connected to an intermediate stage of the apparatus for producing virgin polyester, wherein the second inlet is connected to an apparatus for dosage of bulk material, wherein the outlet is connected downstream to a second reaction vessel of the multiple successive reaction vessels.

14. The apparatus of claim 13 comprising an apparatus for comminution of recycled polyester that is connected upstream of the apparatus for dosage of bulk material.

15. The apparatus of claim 13 comprising:
a first heat exchanger disposed between the apparatus for comminution of recycled polyester and the apparatus for dosage of bulk material; and
a second heat exchanger disposed between the first reaction vessel and the dynamic mixer.

16. The apparatus of claim 13 comprising an apparatus for generating a reduced pressure that is connected to the dynamic mixer.

17. The apparatus of claim 13, wherein the outlet is connected downstream of the intermediate stage to the second reaction vessel of the multiple successive reaction vessels.

18. The apparatus of claim 13, wherein the first reaction vessel is an intermediate stage of the apparatus for producing virgin polyester.

* * * * *